United States Patent [19]

Iwama et al.

[11] Patent Number: 4,618,534
[45] Date of Patent: Oct. 21, 1986

[54] COMPOSITE MEMBRANE AND PROCESS FOR PRODUCING THE SAME

[75] Inventors: Akio Iwama; Kentaro Tasaka; Yoshitaka Kazuse, all of Osaka, Japan

[73] Assignee: Nitto Electric Industrial Co., Ltd., Osaka, Japan

[21] Appl. No.: 663,750

[22] Filed: Oct. 23, 1984

[51] Int. Cl.$^4$ .......................... B32B 3/26; C08D 5/20
[52] U.S. Cl. .............................. 428/316.6; 428/315.5; 428/315.7; 521/27; 525/431
[58] Field of Search ............... 521/27; 428/473.5, 447; 525/431

[56] References Cited

U.S. PATENT DOCUMENTS 3,781,237 12/1973 Alvino et al. .................. 525/431
4,240,914 12/1980 Iwama et al. .................. 521/27
4,393,113 7/1983 Sugie et al. ..................... 428/447
4,483,901 11/1984 Okita et al. ..................... 428/315.5

FOREIGN PATENT DOCUMENTS 0023406 2/1981 European Pat. Off. ............ 521/27

Primary Examiner—Joseph L. Schofer
Assistant Examiner—Peter F. Kulkosky
Attorney, Agent, or Firm—Sughrue, Mion, Zinn, Macpeak, and Seas

[57] ABSTRACT

A composite membrane and a process for producing the same are described. This composite membrane comprises a polyimide resin anisotropic membrane and a cross-linked silicone resin thin film formed on the anisotropic membrane, the anisotropic membrane comprising a dense surface layer and a porous layer continuously connected thereto and the polyimide resin consisting essentially of a repeating unit of the formula:

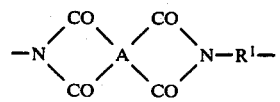

wherein A and $R^1$ are the same as defined hereinbefore. This composite membrane is useful for separation of organic solutions containing relatively small solutes of molecular weight of the order of 10 to 1,000 liquid/liquid separation, and concentration and separation of gases.

21 Claims, 1 Drawing Figure

U.S. Patent    Oct. 21, 1986    4,618,534
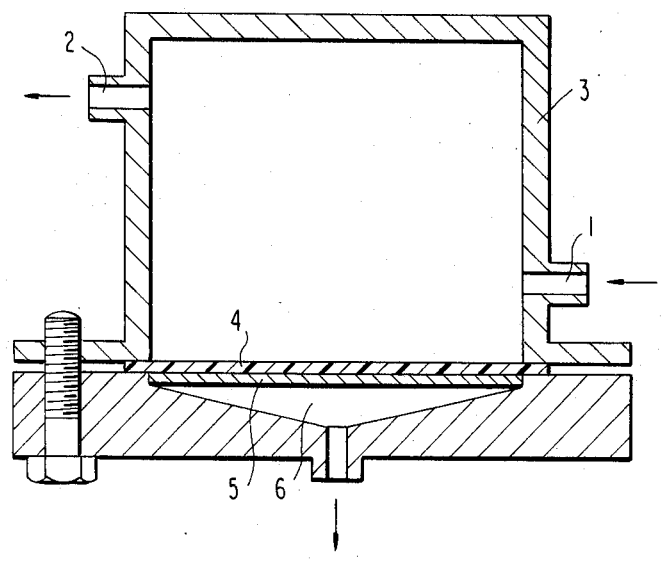

COMPOSITE MEMBRANE AND PROCESS FOR PRODUCING THE SAME

FIELD OF THE INVENTION

The present invention relates to a novel composite membrane and a process for producing the same. More particularly, it is concerned with a composite membrane suitable for use in membrane separation of an organic solution containing a relatively small solute having a molecular weight of from several tens to several thousands, liquid/liquid separation by the pervaporation method, and concentration and separation of gases, and a process for producing the same.

BACKGROUND OF THE INVENTION

For selective separation or removal of a specific component contained in a liquid or gas mixture, a separation method utilizing a membrane has received increasing attention in recent years. This has already been put to practical use in several fields. For example, it is known that a membrane made of a silicone resin is effective in separating an organic component, i.e., a low molecular weight organic compound such as methanol, ethanol, propanol or acetone from an aqueous solution containing the organic compound, or in separation and concentration of oxygen in air. One of the reasons is that a silicone resin exhibits a high selective permeability for a specific organic compound since its surface tension is small as compared with that of the usual organic resins and, furthermore, its intermolecuar force is small. Another reason is that of various resins, the silicone resin has the highest coefficient of permeation for oxygen and nitrogen, for example. Membranes made of polydimethyl siloxane, polydiphenyl siloxane, polyvinyl trimethyl siloxane and the like have heretofore been known.

Membranes made of such silicone resins, however, generally have a poor mechanical strength. In practical membrane separation, therefore, it is necessary for the thickness of the membrane to be increased to 100 μm or more. As is well known, the permeation flux of a membrane is in inverse proportion to its thickness. Therefore, although the silicone membranes have a high coefficient of permeation for organic compounds and gases, they suffer from a problem that a permeation flux is small, which is a factor determining economic efficiency in the membrane separation.

In order to overcome the above problem, it has already been proposed to form a thin film of a silicone resin on a porous substrate made of an organic polymer such as polysulfone or polyacrylonitrile which is conventionally known as an ultrafiltration membrane to thereby increase the mechanical strength of the silicone resin membrane and also to increase the permeation flux by reducing its thickness as described in, for example, Japanese Patent Application (OPI) Nos. 86684/78 and 82380/79 (the term "OPI" as used herein refers to a "published unexamined Japanese patent application"). In forming a silicone resin thin film on such a porous substrate, it is necessary that an organic solution of the silicone resin be coated and then the solvent be evaporated. Since, however, such a porous substrate generally has a low resistance to organic solvents, organic solvents which can be used in preparation of the silicone resin solution are limited to aliphatic solvents of low dissolving power, such as hexane or heptane. Furthermore, these aliphatic solvents can dissolve only silicone resins having a low molecular weight. Therefore, the mechanical strength of a silicone resin thin film formed on a substrate is not sufficiently high and its thickness is still considerably large. In other words, a silicone resin having a molecular weight of 10,000 or more, which is desirable to use in preparation of a thin film having a high mechanical strength, is soluble only in organic solvents of high dissolving power, such as toluene, ethyl acetate or methyl ethyl ketone, and such an organic solution of the silicone resin cannot be coated on a porous substrate as described above.

For separation of an organic liquid mixture, a semipermeable membrane made of an aromatic polyimide resin and a semipermeable membrane made of a polyimide resin prepared by condensation of 1,2,3,4-butanetetracarboxylic acid or its derivative and an aromatic diamine have been proposed and put to practical use. Solutes which can be separated by such a polyimide resin semipermeable membrane are limited to those having a molecular weight of several thousands or more. Such a polyimide resin membrane cannot be applied to reverse osmosis permitting the separation of a solute having a relatively small molecular weight of from several tens to several thousands, or to membrane separation in the intermediate range between reverse osmosis and ultrafiltration.

SUMMARY OF THE INVENTION

The present invention is intended to overcome the above-described various problems.

An object of the present invention is to provide a composite membrane suitable for use in membrane separation of an organic solution containing a low molecular solute having a molecular weight of from several tens to several thousands, pervaporation method for separation of a low molecular weight organic compound such as methanol, ethanol, propanol or acetone from an aqueous solution containing the organic compound, and separation of a gas mixture such as separation of oxygen from nitrogen in air.

Another object of the present invention is to provide a process for producing such a composite membrane.

A composite membrane according to the present invention comprises an anisotropic membrane made of a polyimide resin comprising a dense surface layer and a porous layer continuously connected to the dense surface layer, the polyimide resin consisting essentially of a repeating unit represented by the formula:

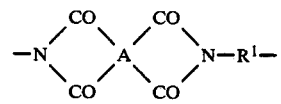

wherein A and $R^1$ are the same as described hereinafter, and a cross-linked silicone resin thin film formed on the dense surface layer of the anisotropic membrane.

Further, a process for producing a composite membrane according to the present invention comprises bringing an organic solution of a cross-linkable silicone resin into contact with the dense surface layer of the anisotropic membrane and cross-linking the silicone resin to form the cross-linked silicone resin thin film on the dense surface layer of the anisotropic membrane.

BRIEF DESCRIPTION OF THE DRAWING

The FIGURE is a cross-sectional view of an apparatus used in measurement of the membrane performance of a composite membrane produced by the present invention.

DETAILED DESCRIPTION OF THE INVENTION

In accordance with the present invention, a cross-linkable silicone resin which is soluble in an organic solvent before cross-linking is dissolved in an organic solvent to prepare a relatively low concentration of organic solution, the organic solution is coated on the surface of a dense layer of a polyimide resin to form a thin layer of the resin solution, the organic solvent is evaporated and the cross-linkable silicone resin is cross-linked to form a thin film of an organic solvent-insoluble silicone resin. As a result, a composite membrane having a thin film of a cross-linked silicone resin on the dense layer of polyimide can be obtained. In the present invention, organic solvents which are difficult to use in the conventional techniques can be used in preparation of a thin resin film. Thus, the present invention permits production of a composite membrane with a thin silicone film which has an excellent mechanical strength and a uniform quality.

The polyimide resin constituting the anisotropic membrane of the present invention consists essentially of a repeating unit represented by the formula:

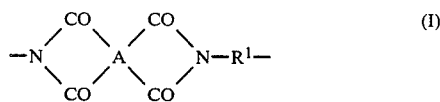

(I)

wherein A is a tetravalent aliphatic or aromatic group, and $R^1$ is a divalent organic group comprising an aromatic, alicyclic or aliphatic hydrocarbon, or a divalent organic group comprising the above hydrocarbon group linked with a divalent organic linking group.

Particularly preferred polyimide resin is a polyimide resin consisting essentially of a repeating unit represented by the formula:

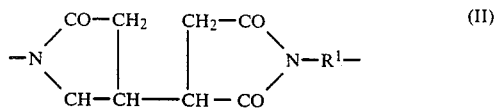

(II)

wherein $R^1$ is the same as defined above.

The intrinsic viscosity, $[\eta]$, of the polyimide resin is preferably from 0.5 to 2 and more preferably from 0.7 to 1.1. The intrinsic viscosity as used herein is determined at 30° C. in an N-methyl-2-pyrrolidone solution. If the intrinsic viscosity is too small, the polyimide resin is inferior in membrane-forming ability. On the other hand, if it is too large, the polyimide resin is only sparingly soluble in an organic solvent and is inferior in membrane-forming workability.

As is well known, an anisotropic membrane of a polyimide resin has an anisotropic structure such that a dense surface layer is supported by a porous layer in one body. Anisotropic membranes having ultrafiltration performance can be produced by, for example, the methods described in Japanese Patent Application (OPI) Nos. 152507/80 and 139104/81.

Anisotropic ultrafiltration membranes made of polyimide resins consisting essentially of repeating units represented by the following formulae:

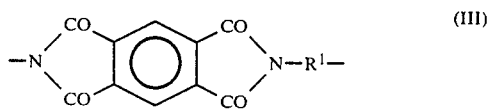

(III)

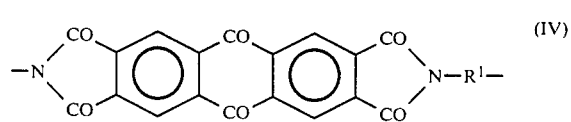

(IV)

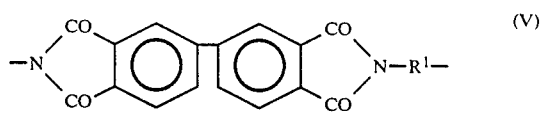

(V)

wherein $R^1$ is the same as defined above, can also be suitably used.

Ultrafiltration membranes having an anisotropic structure which are mede of these polyimide resins are already known and can be produced by, for example, the methods described in H. Strathmann, *Desalination*, 26, 85 (1978) and U.S. Pat. No. 3,925,211. These polyimide resins are usually insoluble in a solvent. Therefore, polyamic acid which is a precursor of the polyimide and is soluble in a solvent is applied and shaped into a membrane and, thereafter, it is ring-closed by heating or by a suitable chemical procedure into the corresponding polyimide resin. In the present invention, for the same reason as described above, it is preferred to use polyamic acid having an intrinsic viscosity $[\eta]$ falling within the range of from 0.5 to 5.

In the above formulae, $R^1$ is a divalent aromatic, alicyclic or aliphatic hydrocarbon group, or a divalent organic group comprising the above hydrocarbon groups linked with a divalent organic linking group.

Examples of the aliphatic group include a straight or branched alkylene group having from 1 to 20 carbon atoms.

Examples of the alicyclic group include a cycloalkylene group having from 5 to 12 carbon atoms which may be substituted with an alkyl group.

Examples of the aromatic group include a phenylene group and a naphthylene group, each having from 6 to 12 carbon atoms, which may be substituted with an alkyl group.

In addition, $R^1$ may be a divalent organic group comprising the above divalent hydrocarbon groups linked with a divalent organic linking group. Examples of such divalent organic linking groups are $-CH_2-$, $-C(CH_3)_2-$, $-O-$, $-S-$, $-SO_2-$, $-CO-$,

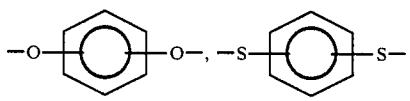

and $-Si(CH_3)_2-$.

It is preferred for the anisotropic membrane of the above polyimide resin so as to have a superior resistance against organic solvents that $R^1$ be a dilvalent aromatic hydrocarbon group or a divalent aromatic group comprising at least two aromatic hydrocarbon groups linked together through an organic linking group as described above. Preferred examples of such aromatic groups are

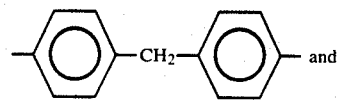 and

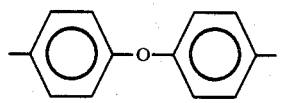.

In the present invention, the above polyimide resin semipermeable membrane has preferably a molecular weight cut-off of from 1,000 to 100,000, more preferably 20,000 to 50,000. If the anisotropic membrane has the molecular weight cut-off of less than 1,000, the permeation flux of the ultimate composite membrane is not sufficiently large. On the other hand, if the molecular weight cut-off is more than 100,000, the cross-linkable silicone resin permeates into the membrane at the time of formation of a thin film as described hereinafter, thereby forming a dense silicone resin layer having a three dimensional net-like structure in the membrane. This results in a substantial increase in the thickness of the layer, and also a decrease in permeation flux.

The molecular weight cut-off can be determined by measuring the rejection of a given anisotropic membrane to a solute having a known molecular weight. In the present invention, a toluene solution containing as a solute 5,000 ppm of polyethylene glycol having a monodisperse molecular weight distribution is applied onto the surface of the membrane at a temperature of 25° C. under a pressure of 2 kg/cm², and the molecular weight cut-off of polyethylene glycol having at least 90% is referred to as a molecular weight cut-off of the membrane.

An anisotropic membrane having such a molecular weight cut-off is generally called an ultrafiltration membrane in liquid separation. In the present invention, it is sometimes called an ultrafiltration membrane. The above anisotropic membrane is used either as a dry membrane or as a glycerin-containing dry membrane.

In accordance with the present invention, an organic solution of a cross-linkable silicone resin is brought into contact with the surface of a dense layer of an anisotropic membrane made of such a polyimide resin to form a uniform thin layer of the organic solution on the surface of the dense layer, the solvent is evaporated from the organic solution thin layer and, if necessary, the layer is heated to cross-link the cross-linkable silicone resin, whereby an organic solvent-insoluble cross-linked silicone resin thin film is formed on the surface of the dense layer of the polyimide ultrafiltration membrane.

The term "a cross-linkable silicone resin" as used herein means a silicone resin which is soluble in organic solvents before cross-linking but, when cross-linked, provides an organic solvent-insoluble resin. In the present invention, organopolysiloxane having a reactive group at each end represented by the formula:

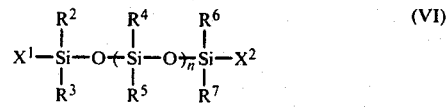 (VI)

wherein $X^1$ and $X^2$ each is a reactive group selected from the group consisting of a vinyl group, an acryloxyalkyl group, a methacryloxyalkyl group, a hydroxy group, a hydroxyalkyl group, an acyloxy group, an aminoalkyl group and a carboxyalkyl group, $R^2$, $R^3$, $R^4$, $R^5$, $R^6$ and $R^7$ each is an organic group selected from the group consisting of an alkyl group (e.g., a methyl group and an ethyl group), a halogenated alkyl group (e.g., a fluoroalkyl group), a vinyl group and an aryl group (e.g., a phenyl group), and n is an integer of from 400 to 1,000, and which is easy to provide a cross-linkable silicone resin having a high average molecular weight, is preferably used.

In the above formula (VI), the repeating unit may be partially replaced by

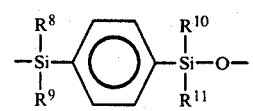

wherein $R^8$, $R^9$, $R^{10}$ and $R^{11}$ are the same as defined for $R^2$ to $R^7$.

Representative examples of such organopolysiloxanes are shown below.

Vinyl-Terminated Organopolysiloxanes:

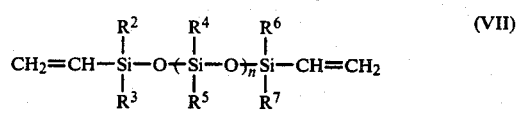 (VII)

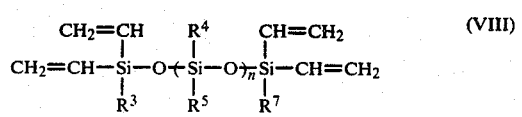 (VIII)

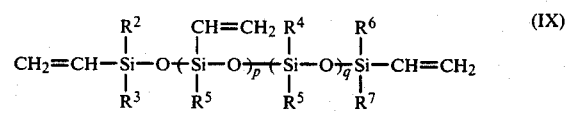 (IX)

wherein p+q=n

Acryloxy or Methacryloxyalkyl-Terminated Organopolysiloxanes:

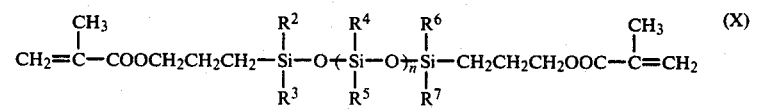 (X)

Silanol-Terminated Organopolysiloxanes:

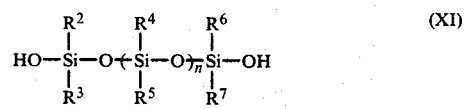 (XI)

-continued

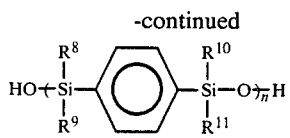
(XII)

Acyloxy-Terminated Organopolysiloxanes:

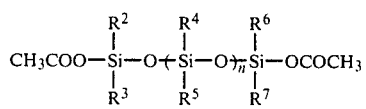
(XIII)

Aminoalkyl-Terminated Organopolysiloxanes:

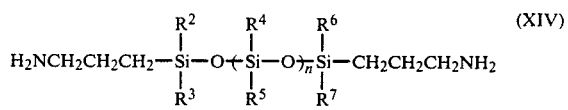
(XIV)

Carboxyalkyl-Terminated Organopolysiloxanes:

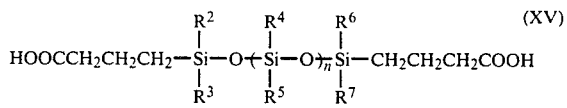
(XV)

Hydroxyalkyl-Terminated Organopolysiloxanes:

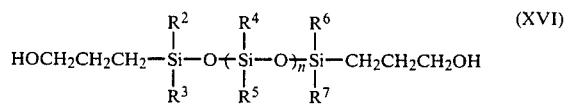
(XVI)

In the above formulae, $R^2$ to $R^{11}$ each is preferably an alkyl group having up to 9 carbon atoms or an aryl group and more preferably an alkyl group such as a methyl group, an ethyl group or a propyl group, or a phenyl group.

In the present invention, at least one of cross-linkable silicone resins as described above are dissolved in an organic solvent, the resulting solution is brought into contact with the surface of the dense layer of the polyimide ultrafiltration membrane, and the resulting layer is cross-linked in the presence or absence of a catalyst or a hardener, if necessary, by heating, to form a thin film of the cross-linked silicone resin.

For example, when silanol-terminated organopolysiloxane, hydroxyalkyl-terminated organopolysiloxane, acetoxy-terminated organopolysiloxane, or the like is used as a cross-linkable silicone resin, it can be insolubilized by evaporating the solvent from the solution and, if necessary, by heating.

When aminopropyl-terminated organopolysiloxane, carboxypropyl-terminated organopolysiloxane, hydroxy-terminated organopolysiloxane, and the like are used, it is preferred to use a hardener in combination. Suitable examples of such hardeners are three or more functional polyisocyanates and polyfunctional epoxy resins. A preferred example of polyisocyanates is "CO-LONATE L" (triisocyanate produced by Nippon Polyurethane Kogyo Co., Ltd.). Polyfunctional epoxy resins used are not particularly limited and conventional epoxy resins containing at least 3 epoxy groups in the molecule can be used. In combination with the above three-functional hardeners, two-functional diisocyanates and epoxy resins can be used. This combination is preferred in some cases. Diisocyanates which can be used include tolylene diisocyanate, m-xylene diisocyanate, 4,4'-diphenylmethane diisocyanate, polytetramethylene glycol, diisocyanate, and polypropylene glycol diisocyanate.

In the case where vinyl-terminated organopolysiloxane or acryloxy- or methacryloxy-terminated organopolysiloxane is used as a cross-linkable silicone resin, the resin can be cross-linked by using a radical initiator as a catalyst. As these radical initiators, various compounds can be used. Typical examples thereof are organic peroxides and azo compounds, such as benzoyl peroxide, methyl ethyl ketone peroxide, cumene hydroperoxide or azobisisobutyronitrile.

In these cases, in place of the radical initiator, ultraviolet rays and electromagnetic radiations such as electron rays, neutron rays, $\alpha$-rays, $\beta$-rays, $\gamma$-rays or X-rays can be used.

In accordance with the present invention, an organic solution of a cross-linkable silicone resin as described above is brought into contact with the surface of a dense layer of an anisotropic membrane of a polyimide resin as described above to form a thin layer of the resin solution, the organic solvent is evaporated (if necessary, by heating) and, thereafter, the layer is heated to cross-link the cross-linkable silicone resin to form a silicone resin thin film which is insoluble in organic solvents. It is desirable for the resin thin film to be as thin as possible. The reason for this is, as described above, that the liquid or gas permeation flux of the composite membrane is substantially determined by the thickness of the resin film and as the thickness is decreased, the liquid or gas permeation flux is increased.

In the present invention, therefore, it is desirable that the concentration of the cross-linkable silicone resin in the organic solution be relatively low. The concentration of the resin is usually from 0.01 to 10% by weight and preferably from 0.1 to 5% by weight. If the resin concentration is less than 0.01% by weight, defects such as pinholes tend to be formed in the thin film formed. On the other hand, if it is more than 10% by weight, the thickness of the resulting film is too large and the permeation flux is too small to use practically the membrane.

In bringing the organic solution of the cross-linkable silicone resin into contact with the surface of the dense layer of the anisotropic membrane made of the polyimide resin, if the resin permeates in the inside of the anisotropic membrane and is cross-linked therein, a dense silicone resin layer is also formed in the membrane. As a result, there is a danger that the thickness of the dense layer is substantially increased. In the present invention, therefore, it is preferred that the average molecular weight of the cross-linkable silicone resin is equal to or greater than the molecular weight cut-off of the polyimide resin anisotropic membrane. Thus, the cross-linkable silicone resin is chosen so as to satisfy the above requirements, taking into consideration the molecular weight cut-off of the polyimide resin anisotropic membrane used. A cross-linkable silicone resin having an average molecular weight of from 1,000 to 1,000,000, preferably from 10,000 to 200,000, is generally used. The term "average molecular weight" as used herein means a weight average molecular weight as determined by the GPC method.

Since, the present invention, all the above-described polyimide resins have excellent resistance against organic solvents, organic solvents which can be used in the preparation of the organic solution of the cross-linkable silicone resin are not limited. A suitable organic solvent is chosen depending on the type of the resin. For example, aliphatic hydrocarbon solvents, aromatic hydrocarbon solvents, alcohol solvents, carboxylic acid solvents, ester solvents, ketone solvents, ether solvents, halogenated hydrocarbon solvents, and the like are used. In more detail, hexane, heptane, benzene, toluene, xylene, methanol, ethanol, propanol, butanol, acetic acid, acrylic acid, ethyl acetate, butyl acetate, acetone, methyl ethyl ketone, methyl isobutyl ketone, tetrahydrofuran, dioxane, methylene chloride, chloroform, carbon tetrachloride, 1,1,1-trichloroethane, and chlorobenzene can be used alone or in combination with each other. It should be noted, however, that the present invention is not limited thereto. Particularly preferred solvents are ethyl acetate, methyl ethyl ketone and toluene.

A relatively low concentration of solution prepared by dissolving the above cross-linkable silicone resin is such an organic solvent is brought into contact with the surface of the dense layer of the polyimide resin anisotropic membrane. In practice, the silicone resin solution is coated on the surface of the dense layer, or the silicone resin solution is coated on the surface of the dense layer by the spin coating method (a coating method using a spinner in which a centrifugal force due to the spinner is utilized), or the surface of the dense layer is dipped in the resin solution. The solvent is removed by heating at a suitable temperature, for example, about 40° to 80° C. By further heating if necessary, as described above, at higher temperatures, the cross-linkable resin is cross-linked and converted into an organic solvent-insoluble three dimensional net-like structure. The temperature for this cross-linking varies depending on the type of the cross-linkable silicone resin used, and also the types of the hardener and catalyst. The temperature range for cross-linking is usually from 50° to 250° C. and preferably from 100° to 200° C. Usually the heating time is from 1 to 60 minutes. Depending on the type of the cross-linkable silicone resin, as described above, it may be cross-linked by irradiating with electromagnetic radiations such as ultraviolet rays, electron rays or X-rays.

The thickness of the thin film of the cross-linked silicone resin formed on the surface of the dense layer of the polyimide resin anisotropic membrane is usually from 10 to 5,000 Å and preferably from 100 to 2,000 Å, although it varies depending on the concentration of the resin solution and the thickness of the thin layer of the solution formed on the dense layer. If the thickness of the thin film is too small, defects tend to be formed in the film. On the other hand, if it is too large, the liquid or gas permeation flux is too small from the practical standpoint.

In the present invention, it is preferred to irradiate the composite membrane with electromagnetic waves, thereby increasing the cross-linking density thereof.

The above electromagnetic wave is not critical and for example, radiations such as electron rays, neutron rays, α-rays, β-rays or γ-rays, and ultraviolet rays can be applied. The dose of the radiation is usually from 1 to 50 Mrad and preferably from 3 to 20 Mrad, although it varies depending on the atmosphere in which the radiation is applied, and the temperature.

When the above composite membrane is irradiated with such electromagnetic waves, a radical molecule is formed in the side chain of polyorganosiloxane of the formula (IV) which constitutes the thin film and the radical molecule participates in the cross-linking reaction, thereby increasing the cross-linking density. Thus, a composite membrane having further excellent mechanical strength, resistance against organic solvents, selective permeability, and so forth can be obtained.

In the present invention, as described above, the polyimide anisotropic membrane is used as a substrate for the composite membrane and an organic solution of a cross-linkable silicone resin having a high molecular weight can be used as a thin film-forming material. For this reason, the thickness of the cross-linked silicone resin thin film formed on the dense layer of the polyimide ultrafiltration membrane can be greatly reduced. Furthermore, the composite membrane has excellent mechanical strength. The cross-linked silicone thin film is not soluble and does not swell in organic solvents. Therefore, the composite membrane is suitable for use in separation of various organic solvents and gases.

The composite membrane of the present invention is particularly effective to remove solutes having a low molecular weight of from several tens to several thousands. For example, the composite membrane is suitable for use in concentration and separation of organic solutions containing low molecular weight solutes, which is in the intermediate region between reverse osmosis and ultrafiltration and is difficult to achieve by membrane separation, or pervaporation method to separate an organic component such as methanol, ethanol, propanol or acetone from an aqueous solution containing the organic component, or separation of a gas mixture.

The composite membrane of the present invention, however, is not limited in its application. As a matter of course, the composite membrane can be used in separation of an aqueous mixture.

The present invention is described in greater detail with reference to the following Examples, although it is not limited thereto. In the Examples, the membrane treatment of an aqueous solution containing organic components was conducted in the following manner to calculate the permeation flux and the components of the membrane permeating solution thus obtained were examined.

As shown in the FIGURE, the composite membrane 4 (effective membrane area, 30.2 cm$^2$) was fitted to an opening of a container 3 with a liquid inlet 1 and a liquid outlet 2. The composite membrane was supported by a porous sintered metal plate 5, and an evacuation chamber 6 at the side of the metallic plate was evacuated. A liquid was introduced through the liquid inlet 1 and withdrawn through the outlet 2. In this manner the liquid was recycled. The evacuation chamber 6 was evacuated to 20 mmHg by means of a vacuum pump. Between the evacuation chamber 6 and the vacuum pump was provided a liquid nitrogen cooling trap were a permeated gas was liquefied and the membrane permeated liquid was collected.

Further, the coefficient of separation to gas was measured by a high vacuum method at 25° C. and the permeation flux ratio for each gas was determined by the permeation flux of a gas by the permeation flux of a control gas.

EXAMPLE 1

An N-methyl-2-pyrrolidone solution containing 22% by weight of polyimide (intrinsic viscosity [η]: 0.91)

having a repeating unit of the formula (II) wherein $R^1$ is

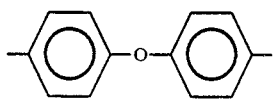

and 22% by weight of diethylene glycol was processed by the conventional phase conversion method described in Japanese Patent Application (OPI) No. 152507/80 to prepare an ultrafiltration membrane having an anisotropic structure. The thickness was 200 μm and the molecular weight cut-off was 20,000.

The pure toluene permeation flux of the above ultrafiltration membrane was 155 l/m²·hr under conditions of temperature 20° C. and pressure 2 kg/cm². The rejection of polyethylene glycol, as determined using a toluene solution containing 5,000 ppm of polyethylene glycol having an average molecular weight of 20,000, was 97.2%.

A mixture of 0.4 part by weight of silanol-terminated polydimethylsiloxane (XI) having an average molecular weight of 36,000, 0.15 part by weight of acetoxy-terminated polydimethylsiloxane (XIII) having an average molecular weight of 36,000, and 0.5 part by weight of triisocyanate (COLONATE L) was dissolved in 100 parts by weight of methyl ethyl ketone to prepare a 0.55% by weight polydimethylsiloxane solution.

The above polyimide ultrafiltration membrane was converted into a glycerin-containing dry membrane. On the surface of the dense layer of the membrane, the above cross-linkable silicone resin solution was uniformly coated at room temperature by dropping by means of a spinner (1,200 rpm). The membrane was then heated up to about 60° C. to completely evaporate the methyl ethyl ketone. The membrane was further heated at 110° C. for 5 minutes to cross-link the silanol-terminated polydimethylsiloxane and acetoxy-terminated polydimethylsiloxane. As a result, a 500 Å thick, insoluble silicone resin thin film was fomred on the surface of the polyimide ultrafiltration membrane, thereby obtaining a composite membrane of the present invention.

The composite membrane was fitted to the apparatus described above and a liquid of water/ethanol (50:50 by weight) was treated in the manner described above. The permeation flux was 8.3 l/m²·hr, and the composition of the permeated liquid was 9% by weight water and 91% by weight ethanol.

The refjection of polyethylene glycol of the above composite membrane, as determined using an ethanol solution containing 5,000 ppm of polyethylene glycol having an average molecular weight of 1,000 under conditions of temperature 20° C. and pressure 4 kg/cm², was 90.4%. The permeation flux was 21 l/m²·hr.

EXAMPLE 2

An N-methyl-2-pyrrolidone solution containing 25% by weight of a polyimide precursor having a repeating unit of the formula (IV) wherein $R^1$ is

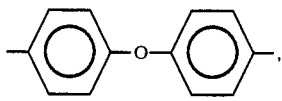

i.e., polyamic acid (intrinsic viscosity [η]: 2.05), and 35% by weight of diethylene glycol dimethyl ether was processed by the conventional phase conversion method to prepare an ultrafiltration membrane having an anisotropic structure having the thickness of 200 μm. This ultrafiltration membrane was dipped in a mixed solvent of (50:50 by weight) acetic anhydride/pyridine at 40° C. for 60 minutes to produce an ultrafiltration membrane made of the above polyimide (molecular weight cut-off: 50,000).

The pure toluene permeation flux of the ultrafiltration membrane under conditions of temperature 20° C. and pressure 2 kg/cm² was 230 l/m²·hr.

A mixture of 0.25 part by weight of vinyl-terminated polydimethylsiloxane (VII) having an average molecular weight of 65,000, 0.25 part by weight of vinyl-terminated polydimethylsiloxane (VIII) having an average molecular weight of 65,000, and 0.1 part by weight of benzoyl peroxide was dissolved in 100 parts by weight of toluene to prepare a 0.5% by weight polydimethylsiloxane solution.

The polydimethylsiloxane solution was uniformly coated at room temperature on the surface of the dense layer of the above polyimide ultrafiltration membrane, heated to about 60° C. to completely remove the toluene, and further heated at 120° C. for 10 minutes to cross-link the vinyl-terminated polydimethylsiloxane, thereby forming a 900 Å thick, insoluble silicone resin thin film on the dense layer of the polyimide ultrafiltration membrane. Thus, a composite membrane of the present invention was obtained.

This composite membrane was fitted to the apparatus as described above and a water/acetone (50:50 by weight) mixture was treated with the membrane. The permeation flux was 9.7 l/m²·hr, and the permeated liquid was composed of 21% by weight water and 79% by weight acetone.

EXAMPLE 3

A mixture of 0.7 part by weight of aminopropyl-terminated polydimethylsiloxane (XIV) having an average molecular weight of 36,000 and 0.07 part by weight of COLONATE L was dissolved in 100 parts by weight of ethyl acetate to prepare a 0.7% by weight polydimethylsiloxane solution.

The polydimethylsiloxane solution was uniformly coated at room temperature on the surface of the dense layer of the same polyimide ultrafiltration membrane as in Example 1, heated to about 40° C. to completely evaporate the ethyl acetate, and further heated at 100° C. for 10 minutes to cross-link the aminopropyl-terminated polydimethylsiloxane, thereby forming a 1,200 Å thick, insoluble silicone resin thin film on the surface of the dense layer of the polyimide resin ultrafiltration membrane. Thus, a composite membrane of the present invention was obtained.

This composite membrane was fitted to the apparatus described above and a water/methanol (50:50 by weight) mixture was treated with the membrane. The permeation flux was 10.9 l/m²·hr, and the permeated liquid was composed of 16% by weight water and 84% by weight methanol.

EXAMPLE 4

A mixture of 0.75 part by weight of methacryloxypropyl-terminated polydimethylsiloxane (X) having an average molecular weight of 36,000 and 1.0 part by weight of benzoyl peroxide was dissolved in 100 parts by weight of toluene to prepare a 0.74% by weight polydimethylsiloxane solution.

The polydimethylsiloxane solution was uniformly coated on the surface of the dense layer of the same polyimide ultrafiltration membrane as used in Example 1 at room temperature, heated up to about 50° C. to completely evaporate the toluene, and further heated at 110° C. for 10 minutes to cross-link the methacryloxy-terminated propyl polydimethylsiloxane, thereby forming a 1,000 Å, insoluble silicone resin thin film on the surface of the dense layer of the polyimide ultrafiltration membrane. Thus, a composite membrane of the present invention was obtained.

With this composite membrane, the gas permeation flux P for various gases was measured. Also, the coefficient of separation α was determined by dividing the permeation flux by the permeation flux of nitrogen.

TABLE 1

| Gas | Permeation Flux P [cm$^3$ (STP)/cm$^2$ · sec · cmHg] | Coefficient of Separation α |
|---|---|---|
| H$_2$ | 8.4 × 10$^{-2}$ | 44 |
| He | 4.4 × 10$^{-2}$ | 23 |
| CO$_2$ | 1.7 × 10$^{-2}$ | 8.9 |
| O$_2$ | 4.5 × 10$^{-2}$ | 2.4 |
| N$_2$ | 1.9 × 10$^{-3}$ | 1 |

EXAMPLE 5

A composite membrane produced in the same manner as in Example 1 was irradiated with electron rays at a dose of 10 Mrad in a nitrogen gas atmosphere at room temperature using an electron ray-emitting apparatus (Model CB-150 ELECTROCURTAIN produced by ESI Co., Ltd.).

This composite membrane was fitted to the apparatus used in Example 1, and a liquid of water and ethanol (50:50 by weight) was treated. The permeated liquid was composed of 5% by weight water and 95% by weight ethanol, and the permeation flux was 6.8 l/m$^2$·hr.

The composite membrane was measured for membrane performance under the same conditions as in Example 1. The polyethylene glycol (average molecular weight: 1,000) removal ratio was 95.3%, and the permeation flux was 15 l/m$^2$·hr.

While the invention has been described in detail and with reference to specific embodiments thereof, it will be apparent to one skilled in the art that various changes and modifications can be made therein without departing from the spirit and scope thereof.

What is claimed is:

1. A composite membrane comprising
   an anisotropic membrane made of a polyimide resin comprising a dense surface layer and a porous layer continuously connected to the dense surface layer, said polyimide resin consisting essentially of a repeating unit represented by the formula:

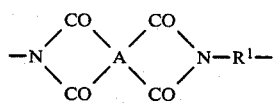

wherein A is a tetravalent aliphatic or aromatic group, and R$^1$ is a divalent aromatic, alicyclic or aliphatic hydrocarbon group, or a divalent organic group comprising the hydrocarbon groups linked with a divalent organic linking group, and a cross-linked silicone resin thin film formed on the dense surface layer of the anisotropic membrane.

2. The composite membrane as claimed in claim 1, wherein the polyimide resin anisotropic membrane has the molecular weight cut-off of from 1,000 to 100,000.

3. The composite membrane as claimed in claim 1, wherein said polyimide resin consists essentially of the repeating unit represented by the formula

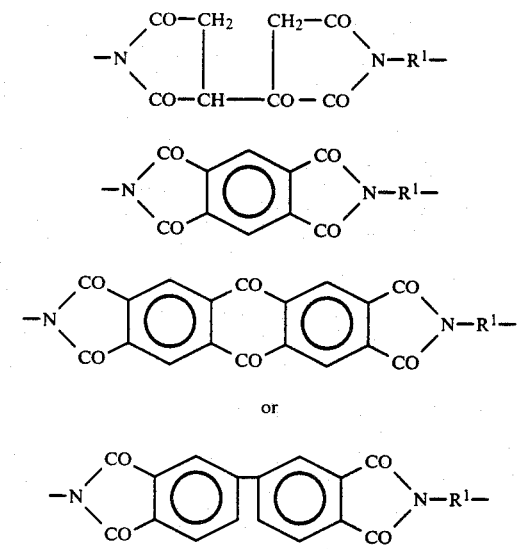

or

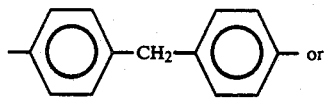

4. The composite membrane as claimed in claim 1, wherein R$^1$ is

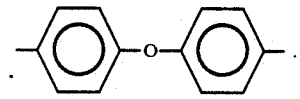

5. A process for producing a composite membrane which comprises
   bringing an organic solution of a cross-linkable silicone resin into contact with a dense surface layer of a polyimide resin anisotropic membrane comprising the dense surface layer and a porous layer continuously connected to the dense surface layer, said polyimide resin consisting essentially of a repeating unit represented by the formula:

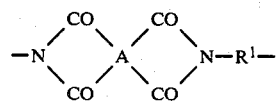

wherein A is a tetravalent aliphatic or aromatic group, and R$^1$ is a divalent aromatic, alicyclic or aliphatic hydrocarbon group, or a divalent organic group comprising the hydrocarbon groups linked with a divalent organic linking group, and, cross-linking the silicone resin to form a cross-linked silicone resin thin film on the dense surface layer of the anisotropic membrane.

6. The process as claimed in claim 5, wherein the polyimide resin anisotropic membrane has the molecular weight cut-off of from 1,000 to 100,000.

7. The process as claimed in claim 5, wherein the cross-linkable silicone resin is a compound represented by the formula:

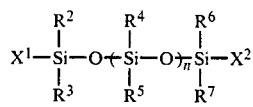

wherein $X^1$ and $X^2$ each is a reactive group selected from the group consisting of a vinyl group, an acryloxyalkyl group, a methacryloxyalkyl group, a hydroxyl group, a hydroxyalkyl group, an acyloxy group, an aminoalkyl group and a carboxyalkyl group, $R^2$, $R^3$, $R^4$, $R^5$, $R^6$ and $R^7$ each is an organic group selected from the group consisting of an alkyl group, a halogenated alkyl group, a vinyl group and an aryl group, and n is an integer of from 400 to 1,000.

8. The process as claimed in claim 5, wherein the average molecular weight of the cross-linkable silicone resin is equivalent to or greater than the molecular weight cut-off of the polyimide resin anisotropic membrane.

9. The process as claimed in claim 5, wherein the concentration of the cross-linkable silicone resin in the solution is from 0.01 to 10% by weight.

10. The composite membrane as claimed in claim 1, wherein said polyimide resin has an intrinsic viscosity of from 0.5 to 2.0.

11. The composite membrane as claimed in claim 1, wherein said cross-linked silicone resin film is formed by contacting said dense surface layer with an organic solvent solution of a cross-linkable silicone resin which is then cross-linked to yield said cross-linked silicone resin thin film on said dense surface layer.

12. The composite membrane as claimed in claim 11, wherein said cross-linkable silicone resin has an average molecular weight of 1,000 to 1,000,000.

13. The composite membrane as claimed in claim 12, wherein said organic solvent is selected from the group consisting of aliphatic hydrocarbon solvents, aromatic hydrocarbon solvents, alcohol solvents, carboxylic acid solvents, ester solvents, ketone solvents, ether solvents and halogenated hydrocarbon solvents.

14. The composite membrane as claimed in claim 1, wherein said cross-linked silicone resin thin film has a thickness of from 10 to 5,000 Angstroms.

15. The composite membrane as claimed in claim 12, wherein said cross-linkable silicone resin is a compound represented by the formula:

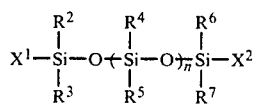

wherein $X^1$ and $X^2$ each is a reactive group selected from the group consisting of a vinyl group, an acryloxyalkyl group, a methacryloxyalkyl group, a hydroxyl group, a hydroxyalkyl group, an acyloxy group, an aminoalkyl group and a carboxyalkyl group, $R^2$, $R^3$, $R^4$, $R^5$, $R^6$ and $R^7$ each is an organic group selected from the group consisting of an alkyl group, a halogenated alkyl group, a vinyl group and an aryl group, and n is an integer of from 400 to 1,000.

16. The process as claimed in claim 5, wherein said polyimide resin has an intrinsic viscosity of from 0.5 to 2.0.

17. The process as claimed in claim 7, wherein said cross-linkable silicone resin has an average molecular weight of 1,000 to 1,000,000.

18. The process as claimed in claim 7, wherein said organic solvent is selected from the group consisting of aliphatic hydrocarbon solvents, aromatic hydrocarbon solvents, alcohol solvents, carboxylic acid solvents, ester solvents, ketone solvents, ether solvents and halogenated hydrocarbon solvents.

19. The process as claimed in claim 17, wherein said cross-linked silicone resin thin film has a thickness of from 10 to 5,000 Angstroms.

20. The process as claimed in claim 5, wherein said polyimide resin consists essentially of the repeating unit represented by the formula:

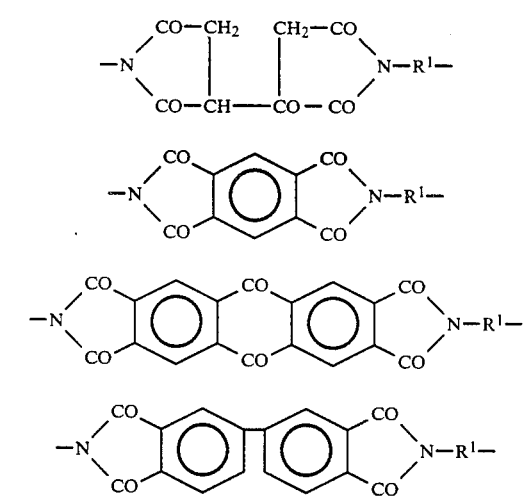

21. The process as claimed in claim 5, wherein $R^1$ is

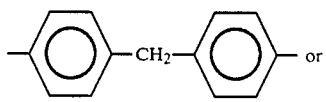 or

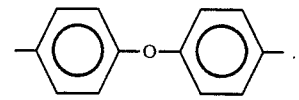

* * * * *